United States Patent
Kato et al.

(10) Patent No.: US 11,527,778 B2
(45) Date of Patent: Dec. 13, 2022

(54) ALL-SOLID-STATE BATTERY AND PRODUCTION METHOD THEREFOR

(71) Applicant: TOYOTA JIDOSHA KABUSHIKI KAISHA, Toyota (JP)

(72) Inventors: Kazuhito Kato, Sunto-gun (JP); Shinji Kojima, Susono (JP); Hiroshi Fujiwara, Susono (JP); Katsuaki Odagi, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 17/347,748

(22) Filed: Jun. 15, 2021

(65) Prior Publication Data
US 2021/0313625 A1    Oct. 7, 2021

Related U.S. Application Data

(62) Division of application No. 16/404,915, filed on May 7, 2019, now Pat. No. 11,088,397.

(30) Foreign Application Priority Data

May 14, 2018  (JP) .............................. JP2018-093243

(51) Int. Cl.
 *H01M 10/0585* (2010.01)
 *H01M 10/0562* (2010.01)
 *H01M 10/0565* (2010.01)

(52) U.S. Cl.
 CPC ... *H01M 10/0585* (2013.01); *H01M 10/0562* (2013.01); *H01M 10/0565* (2013.01); *H01M 2300/0065* (2013.01)

(58) Field of Classification Search
 CPC ........ H01M 10/0562; H01M 10/0565; H01M 10/0585; H01M 2300/0065
 See application file for complete search history.

(56) References Cited

U.S. PATENT DOCUMENTS

2004/0185336 A1   9/2004  Ito
2004/0234847 A1   11/2004 Mino
(Continued)

FOREIGN PATENT DOCUMENTS

EP          1458037 A1    9/2004
JP      2014-086213 A    5/2014
(Continued)

*Primary Examiner* — Amanda C. Walke
(74) *Attorney, Agent, or Firm* — Sughrue Mion, PLLC (57) ABSTRACT

An all-solid-state battery, wherein on a first side surface of an all-solid-state battery laminate, a first electrode current collector layer includes a first electrode current collector protruding part, which protrudes in a surface direction, and a second electrode current collector layer includes a second electrode current collector protruding part, which protrudes in a surface direction, a surface direction area of a second electrode-solid electrolyte laminate is larger than a surface direction area of a first electrode laminate, the first electrode laminate is laminated on the inside of the second electrode-solid electrolyte laminate when viewed from the lamination direction, and on the first side surface, an edge of the second electrode-solid electrolyte laminate in the surface direction is at least partially covered with a resin layer so that the first electrode current collector protruding part does not directly contact the edge in the surface direction of the second electrode-solid electrolyte laminate.

8 Claims, 4 Drawing Sheets

(56) References Cited

U.S. PATENT DOCUMENTS

| | | |
|---|---|---|
| 2014/0079992 A1 | 3/2014 | Tanaka |
| 2016/0190640 A1 | 6/2016 | Visco |
| 2017/0005367 A1 | 1/2017 | Van Berkel |
| 2018/0166743 A1 | 6/2018 | Lee |
| 2018/0233711 A1 | 8/2018 | Kato |
| 2019/0214684 A1 | 7/2019 | Waseda |
| 2019/0348717 A1 | 11/2019 | Kato |
| 2019/0393557 A1 | 12/2019 | Itoh |

FOREIGN PATENT DOCUMENTS

| | | |
|---|---|---|
| JP | 2015-162353 A | 9/2015 |
| JP | 2016-119183 A | 6/2016 |
| JP | 2018-14194 A | 1/2018 |
| JP | 2018-49696 A | 3/2018 |
| JP | 2018092772 A | 6/2018 |
| JP | 2019096476 A | 6/2019 |
| WO | 2010089855 A1 | 8/2012 |

FIG. 3

FIG. 4 ical Problem

ALL-SOLID-STATE BATTERY AND PRODUCTION METHOD THEREFOR

CROSS REFERENCE TO RELATED APPLICATIONS

The present application is a divisional of U.S. application Ser. No. 16/404,915 filed May 7, 2019 (allowed), which claims priority from Japanese patent application JP 2018-093243 filed on May 14, 2018. The entire disclosures of the prior applications are considered part of the disclosure of the accompanying continuation application, and are hereby incorporated by reference.

FIELD

The present disclosure relates to an all-solid-state battery and a method for the production thereof.

BACKGROUND

In recent years, all-solid-state batteries in which the electrolytic solution is replaced with a solid electrolyte have attracted attention. As a result, development of practical applications of all-solid-state batteries has been actively conducted.

For example, in order to reduce resistance at the electrode-electrolyte layer interface and suppress output reduction, Patent Literature 1 discloses a method for producing an all-solid-state battery, wherein, in a state in which a solid electrolyte layer is arranged between a pair of electrodes, a positive electrode and a negative electrode, the pair of electrodes are pressed toward each other to form a laminate, a restraining part to regulate the expansion of the solid electrolyte layer in this pressurized state is provided so as to cover at least the end part of the formed laminate, and thereafter, the pressure is released.

Furthermore, conventionally, in all-solid-state batteries, the area of the positive electrode and the area of the negative electrode are different. For example, in order to prevent or suppress breakage at the battery end of an all-solid-state battery in which the area of the negative electrode is larger than the area of the positive electrode, Patent Literature 2 discloses a method for producing an all-solid-state battery wherein an insulator having a thickness equal to or less than the thickness of the positive electrode is provided and disposed in a part of a gap formed between the positive electrode and the negative electrode in the outer peripheral portion of the positive electrode, a solid electrolyte layer is interposed between the positive electrode including the insulator and the negative electrode, and pressure is applied from both sides thereof.

Further, in order to prevent short-circuiting between positive electrodes and negative electrodes, Patent Literature 3 discloses a method for producing an electrode body having a structure in which a positive electrode mixture layer is covered with an insulating layer containing resin particles.

CITATION LIST

Patent Literature

[PTL 1] Japanese Unexamined Patent Publication (Kokai) No. 2014-086213
[PTL 2] Japanese Unexamined Patent Publication (Kokai) No. 2015-162353
[PTL 3] Japanese Unexamined Patent Publication (Kokai) No. 2016-119183

SUMMARY

Technical Problem

In laminate-type all-solid-state batteries, such as lithium ion batteries, during charging, in order for the lithium ions released from a positive electrode active material layer to move smoothly and reliably to a negative electrode active material layer, it is preferable that a negative electrode laminate comprising the negative electrode active material layer and a negative electrode current collector layer be formed so as to have an area which is larger than that of a positive electrode laminate comprising the positive electrode active material layer and a positive electrode current collector layer. Furthermore, in such laminate-type all-solid-state batteries, in order to extract the generated power to the outside, a positive electrode current collector protruding part and a negative electrode current collector protruding part, which protrude in the surface direction, of the positive electrode current collector layer and the negative electrode current collector layer, respectively, are provided so as to protrude from the same side surface of the laminate.

However, when bundling the positive electrode current collector protruding parts to extract electricity, there is a risk of short-circuit due to contact between the positive electrode current collector protruding parts and the edges of the negative electrode laminate, which is formed with an area larger than the positive electrode laminate. Furthermore, there is a risk of damage to the negative electrode laminate, which is formed with a larger area, due to the contact.

Conversely, when the positive electrode laminate comprising the positive electrode active material layer and the positive electrode current collector layer is formed so as to have an area larger than the negative electrode laminate comprising the negative electrode active material layer and the negative electrode current collector layer, when bundling the negative electrode current collector protruding parts to extract electricity, there is a risk of short-circuit due to contact between the negative electrode current collector protruding parts and the edges of the positive electrode laminate, which is formed with an area larger than the negative electrode laminate.

The present disclosure has been made in light of the above circumstances, and aims to provide a laminate-type all-solid-state battery which can prevent the occurrence of short-circuiting and which can prevent damage to the electrodes, and a method for producing the all-solid-state battery.

Solution to Problem

The inventors of the present disclosure have discovered that the above problems can be solved by the following means.

An all-solid-state battery, comprising:
an all-solid-state battery laminate in which at least one first electrode laminate and at least one second electrode-solid electrolyte laminate are laminated,
wherein the first electrode laminate comprises a first electrode current collector layer and a first electrode active material layer formed on at least one surface of the first electrode current collector layer,
wherein the second electrode-solid electrolyte laminate comprises a second electrode current collector layer, a second electrode active material layer formed on at least one surface of the second electrode current collector layer, and a solid electrolyte layer, wherein on a first side surface of the all-solid-state battery laminate, the first electrode current collector layer comprises a first electrode current collector protruding part, which protrudes in a surface direction, and the second electrode current collector layer comprises a second electrode current collector protruding part, which protrudes in a surface direction, wherein a surface direction area of the second electrode-solid electrolyte laminate is larger than a surface direction area of the first electrode laminate, and the first electrode laminate is laminated on the inside of the second electrode-solid electrolyte laminate when viewed from the lamination direction, and wherein on the first side surface, only an edge of the second electrode-solid electrolyte laminate in the surface direction is at least partially covered with a resin layer.

Further, the first electrode is a positive electrode and the second electrode is a negative electrode.

Further, the resin layer may extend along the entirety of the edge on the first side surface.

Further, the resin layer may extend along the entirety of an end face of the second electrode-solid electrolyte laminate on the first side surface.

The resin layer may extend to a portion of the second electrode current collector protruding part on the first side surface.

The all-solid-state battery laminate may be a monopolar-type laminate.

Further, a resin constituting the resin layer is a curable resin or a thermoplastic resin.

A method for producing the all-solid-state battery, comprising the following steps:

(a) applying a resin constituting the resin layer to a releasable substrate, (b) contacting, from a lower side, the resin with an edge of a lower side of the second electrode-solid electrolyte laminate in the surface direction to at least partially coat the edge of the lower side in the surface direction with the resin, and (c) releasing the releasable substrate from the resin.

The method may further comprise:

(b1) after step (b) and before step (c), applying, from an upper side, the resin constituting the resin layer to an edge of an upper side of the second-solid electrolyte laminate in the surface direction opposite the resin-coated edge of the lower side in the surface direction to coat the edge of the upper side with the resin.

A method for producing the all-solid-state battery, comprising the following steps:

(d) placing a releasable substrate on a lower side of an edge of the second electrode-solid electrolyte laminate in the surface direction, (e) applying, from an upper side, a resin constituting the resin layer to an edge of the second electrode-solid electrolyte laminate in the surface direction to coat an edge of an upper side of the second electrode-solid electrolyte laminate in the surface direction with the resin, (f) releasing the releasable substrate from the resin, and inverting the second electrode-solid electrolyte layer laminate up-and-down, and (g) applying, from an upper side, a resin constituting the resin layer to an edge of an upper side the second electrode-solid electrolyte laminate in the surface direction after inversion to coat an edge of an upper side of the second electrode-solid electrolyte laminate in the surface direction after inversion with the resin.

A method for producing the all-solid-state battery, comprising the following step:

applying, from the upper side and lower side at the same time, a resin constituting the resin layer to edges of the second electrode-solid electrolyte laminate in the surface direction to coat the edges of the upper side and the lower side with the resin.

Further, the resin constituting the resin layer is a photo-curable resin, and the method further comprises forming the resin layer by irradiating the resin coating the second electrode-solid electrolyte laminate to cure the resin.

Advantageous Effects of Invention

According to the all-solid-state battery and the method for producing an all-solid-state battery of the present disclosure, the occurrence of short-circuiting can be prevented and damage to the electrode laminates can be prevented.

DESCRIPTION OF EMBODIMENTS

The embodiments of the present disclosure will be described in detail below referring to the drawings. Note that, for convenience of explanation, in the drawings, the same or corresponding portions are assigned the same reference numerals, and duplicate explanations therefor have been omitted. Not all of the constituent elements of the embodiments are necessarily indispensable. Some of the constituent elements may be optional. The forms shown in the drawings below are examples of the present disclosure and do not limit the present disclosure.

<<All-Solid-State Battery>>

The all-solid-state battery of the present disclosure comprises:

an all-solid-state battery laminate in which at least one first electrode laminate and at least one second electrode-solid electrolyte laminate are laminated, wherein the first electrode laminate comprises a first electrode current collector layer and a first electrode active material layer formed on at least one surface of the first electrode current collector layer, wherein the second electrode-solid electrolyte laminate comprises a second electrode current collector layer, a second electrode active material layer formed on at least one surface of the second electrode current collector layer, and a solid electrolyte layer, wherein on a first side surface of the all-solid-state battery laminate, the first electrode current collector layer comprises a first electrode current collector protruding part, which protrudes in a surface direction, and the second electrode current collector layer comprises a second electrode current collector protruding part, which protrudes in a surface direction, wherein a surface direction area of the second electrode-solid electrolyte laminate is larger than a surface direction area of the first electrode laminate, and the first electrode laminate is laminated on the inside of the second electrode-solid electrolyte laminate when viewed from the lamination direction, and wherein on the first side surface, only an edge of the second electrode-solid electrolyte laminate in the surface direction is at least partially covered with a resin layer.

In the present disclosure, "first side surface of the all-solid-state battery laminate" refers to an arbitrary side surface along the lamination direction of the all-solid-state battery laminate. On this first side surface, the first electrode current collector layer and the second electrode current collector layer comprise a first electrode current collector protruding part and a second electrode current collector protruding part, which protrude in the surface direction, respectively. Furthermore, "surface direction" refers to the direction of the surface perpendicular to the lamination direction of the all-solid-state battery laminate.

Furthermore, in the present disclosure, as long as the first electrode and the second electrode are different electrodes, they are not particularly limited. For example, the first electrode may be a positive electrode and the second electrode may be a negative electrode, or the first electrode may be a negative electrode and the second electrode may be a positive electrode. When the first electrode is a positive electrode, "first current collector layer" and "positive electrode current collector layer" are synonymous, and "first electrode active material layer" and "positive electrode active material layer" are synonymous. Furthermore, when the first electrode is a negative electrode, "first current collector layer" and "negative electrode current collector layer" are synonymous, and "first electrode active material layer" and "negative electrode active material layer" are synonymous. Likewise, when the second electrode is a positive electrode, "second current collector layer" and "positive electrode current collector layer" are synonymous, and "second electrode active material layer" and "positive electrode active material layer" are synonymous. When the second electrode is a negative electrode, "second current collector layer" and "negative electrode current collector layer" are synonymous, and "second electrode active material layer" and "negative electrode active material layer" are synonymous.

From the viewpoint of facilitating smooth and reliable movement of the lithium ions released from the positive electrode active material layer to the negative electrode active material layer during charging, it is preferable that the first electrode of the all-solid-state battery of the present disclosure be a positive electrode and the second electrode be a negative electrode.

The all-solid-state battery and the method for the production thereof of the present disclosure will be described below using the case in which the first electrode is a positive electrode and the second electrode is a negative electrode as an example.

Figure 1:
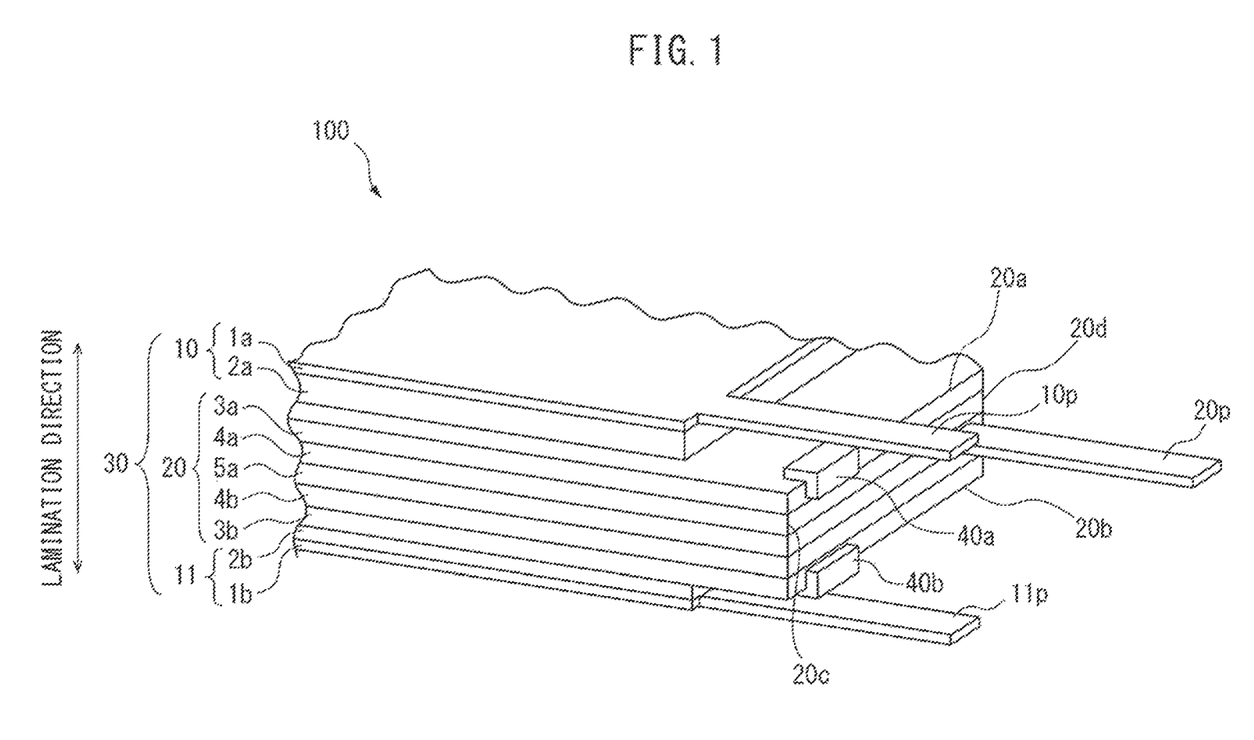
FIG. 1 is a perspective view schematically showing a portion of an embodiment of the all-solid-state battery of the present disclosure.

FIG. 1 is a perspective view schematically showing a portion of an embodiment of the all-solid-state battery of the present disclosure.

The all-solid-state battery 100 of the present disclosure shown in FIG. 1 comprises an all-solid-state battery laminate 30 in which positive electrode laminates 10 and 11 and a negative electrode-solid electrolyte laminate 20 are laminated. The positive electrode laminate 10 comprises a positive electrode current collector layer 1a and a positive electrode active material layer 2a formed on a surface of the positive electrode current collector 1a. The additional positive electrode laminate 11 comprises a positive electrode current collector layer 1b and a positive electrode active material layer 2b formed on a surface of the positive electrode active material layer 1b. Furthermore, the negative electrode-solid electrolyte laminate 20 comprises a negative electrode current collector layer 5a, negative electrode active material layers 4a and 4b formed on opposite surfaces of the negative electrode current collector layer 5a, and solid electrolyte layers 3a and 3b.

On the first side surface of the all-solid-state battery laminate 30, the positive electrode current collector layers 1a and 1b comprise positive electrode current collector protruding parts 10p and 11p, which protrude in the surface direction, respectively, and the negative electrode current collector layer 5a comprises negative electrode current collector protruding part 20p, which protrude in the surface direction. The surface direction area of the negative electrode-solid electrolyte laminate 20 is larger than the surface direction area of the positive electrode laminates 10 and 11, and the positive electrode laminates 10 and 11 are laminated on the inside of the negative electrode-solid electrolyte laminate 20 when viewed from the lamination direction.

On the first side surface of the all-solid-state battery laminate 30, only the edges 20a and 20b of the negative electrode-solid electrolyte laminate 20 in the surface direction are at least partially covered by resin layers 40a and 40b. As a result, due to the presence of the resin layers 40a and 40b, even if the positive electrode current collector protruding parts 10p and 11p are bundled for extracting electricity, contact between the positive electrode current collector protruding parts 10p and 11p and the edges 20a and 20b of the negative electrode-solid electrolyte laminate 20 in the surface direction can be prevented. In other words, as a result, the occurrence of short-circuiting can be prevented. Furthermore, as a result, since direct contact between the positive electrode current collector protruding parts 10p and 11p and the edges 20a and 20b of the negative electrode-solid electrolyte laminate 20 in the surface direction can be prevented, damage to the negative electrode-solid electrolyte laminate 20 can be prevented.

<Resin Layer>

From the viewpoint of better exerting the effect of the present disclosure, it is preferable that, on the first side surface of the all-solid-state battery laminate, the resin layer extends over the entirety of the edges of the negative electrode-solid electrolyte laminate in the surface direction.

Furthermore, it is preferable that, on the first side surface of the all-solid-state battery laminate, the resin layer extends along the entirety of the end face of the negative electrode-solid electrolyte laminate. This is because the effect of the present disclosure can be better exerted and protection of the negative electrode-solid electrolyte laminate can be achieved.

"The end face of the negative electrode-solid electrolyte laminate" refers to the side surface on the first side surface of the all-solid-state battery laminate including the edge of the negative electrode-solid electrolyte laminate in the surface direction and the edge of the negative electrode-solid electrolyte laminate in the lamination direction. In the allsolid-state battery 100 shown in FIG. 1, this end face refers to, for example, the surface including the edges 20a and 20b of the negative electrode-solid electrolyte laminate 20 in the surface direction and the edges 20c and 20d of the negative electrode-solid electrolyte laminate 20 in the lamination direction.

Further, on the first side surface of the all-solid-state battery laminate, it is preferable that the resin layer extends to a portion of the negative electrode current collector protruding part.

In order to solve the above short-circuiting problem, conventionally, attaching an insulation tape to the edge of the negative electrode-solid electrolyte laminate in the surface direction has been considered. However, it is difficult to apply an insulating tape to the negative electrode current collector protruding parts. Thus, when the negative electrode current collector protruding parts are gathered, it is difficult to prevent damage at the site of occurrence of a load (in particular, the attachment portions of the negative electrode current collector protruding parts with the negative electrode current collector layer) due to the bending of the negative electrode current collector protruding parts.

When the resin layer extends to a portion of the negative electrode current collector protruding part, as in the configuration of the present disclosure, at the site of occurrence of damage due to the bending of the negative electrode current collector protruding parts, the load is exerted on the resin layer, whereby the effect of protecting the attachment portion of the negative electrode current collector protruding parts with the negative electrode current collector layer can be satisfied. Note that the region to which the resin layer extends on the negative electrode current collector protruding part is not particularly limited as long as bundling of the negative electrode current collector protruding parts is not inhibited when extracting electricity.

Figure 2:
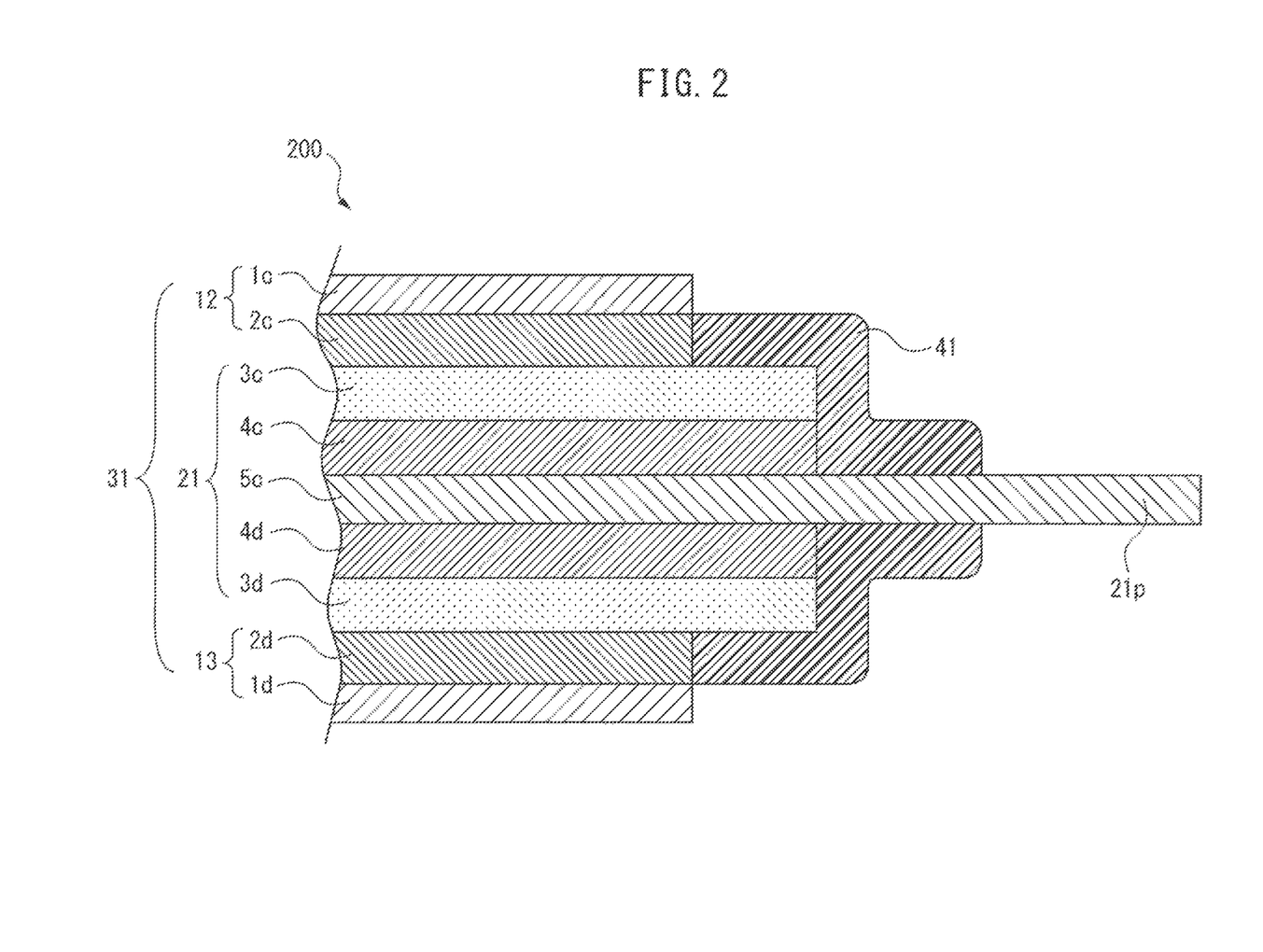
FIG. 2 is a cross-sectional view schematically showing a portion of an embodiment of the all-solid-state battery of the present disclosure.

FIG. 2 is a cross-sectional view schematically showing a portion of an embodiment of the all-solid-state battery of the present disclosure.

On the first side surface of the all-solid-state battery laminate 31 of the all-solid-state battery 200 of the present disclosure shown in FIG. 2, the resin layer 41 extends across the entirety of the edges of the negative electrode-solid electrolyte laminate 21 in the surface direction, the entire end face of the negative electrode-solid-electrolyte laminate 21, and a portion of the negative electrode current collector protruding part 21p. Note that, in FIG. 2, positive electrode current collector protruding parts, which protrude in the surface direction of the positive electrode current collector layer of the all-solid-state battery 200, have been omitted.

As a result of the configuration of the all-solid-state battery 200 shown in FIG. 2, when extracting electricity, even if the positive electrode current collector protruding parts are bundled, no contact is made with the edge of the negative electrode-solid electrolyte laminate 21, whereby the occurrence of short-circuiting can be prevented. Furthermore, due to this configuration, the negative electrode-solid electrolyte laminate 21 can be protected. Further, due to this configuration, the attachment portion of the negative electrode current collector protruding part 21p with the negative electrode current collector layer 5c can be protected.

The resin constituting the resin layer is not particularly limited and may be a curable resin or a thermoplastic resin. Furthermore, the curable resin may be a thermosetting resin, a photocurable resin, such as an ultraviolet curable resin (referred to as "UV curable resin"), or an electron-beam-curable resin. Among these, in consideration of cycle time and from the viewpoint of ease of application, it is preferable that a photocurable resin, in particular, a UV curable resin, be used as the resin constituting the resin layer.

More specifically, the resin constituting the resin layer may be, for example, an epoxy resin, an acrylic resin, a polyimide resin, a polyester resin, a polypropylene resin, a polyamide resin, a polystyrene resin, a polyvinylchloride resin, or a polycarbonate resin. However, the resin constituting the resin layer is not limited thereto.

The thickness of the resin layer is not particularly limited and can be appropriately selected in accordance with the use or application of the desired all-solid-state battery. However, when one positive electrode laminate is present between two negative electrode-solid electrolyte laminates, the combined thickness of the resin layers coating the two negative electrode-solid electrolyte laminates is preferably the same as or less than the thickness of the one positive electrode laminate, and more preferably the same as the thickness of the one positive electrode laminate. This is because the load of the positive electrode current collector protruding parts can be applied to the resin layer and damage to the electrode can be prevented when the positive electrode current collector protruding parts of the one positive electrode current collector are bundled with other positive electrode current collector protruding parts to collect current.

<All-Solid-State Battery Laminate>

The all-solid-state battery laminate obtains by laminating at least one positive electrode laminate and at least one negative electrode-solid electrolyte laminate. The positive electrode laminate comprises a positive electrode current collector layer and a positive electrode active material layer formed on at least one surface of the positive electrode current collector layer. The negative electrode-solid electrolyte laminate comprises a negative electrode current collector layer, a negative electrode active material layer formed on at least one surface of the negative electrode current collector layer, and a solid electrolyte layer.

The all-solid-state laminate may be a monopolar-type laminate or may be a bipolar-type laminate. Among these, the all-solid-state battery laminate is preferably a monopolar-type laminate on the premise that the positive electrode current collector protruding parts and the negative electrode current collector protruding parts for extracting electricity can be bundled. This is because the effect of the present disclosure can be better exhibited thereby.

Monopolar-type all-solid-state battery laminates and bipolar-type all-solid-state battery laminates can be formed according to the configuration and lamination order of the positive electrode laminates and negative electrode-solid electrolyte laminates included therein.

Monopolar-type all-solid-state battery laminates can comprise, laminated in this order, for example, a first positive electrode laminate comprising a positive electrode current collector layer and a positive electrode active material layer laminated in this order, a negative electrode-solid electrolyte laminate comprising a solid electrolyte layer, a negative electrode active material layer, a negative electrode current collector layer, a negative electrode active material layer, and a solid electrolyte layer laminated in this order, and a second positive electrode laminate comprising a positive electrode active material layer and a positive electrode current collector layer laminated in this order.

More specifically, as shown in FIG. 2, the all-solid-state battery laminate 31 is a monopolar-type laminate comprising, laminated in this order, a positive electrode laminate 12 comprising a positive electrode current collector layer 1c and a positive electrode active material layer 2c laminated in this order, a negative electrode-solid electrolyte laminate 21 comprising a solid electrolyte layer 3c, a negative electrode active material layer 4c, a negative electrode current collector layer 5c, a negative electrode active material layer 4d, and a solid electrode layer 3d laminated in this order, and a positive electrode laminate 13 comprising a positive electrode active material layer 2d and a positive electrode current collector layer 1d laminated in this order.

Bipolar-type all-solid-state battery laminates can comprise, laminated in this order, for example, a first negative electrode-solid electrolyte laminate comprising a negative electrode current collector layer, a negative electrode active material layer, and a solid electrolyte layer laminated in this order, a first positive electrode laminate comprising a positive electrode active material layer and a positive electrode current collector layer laminated in this order, a second negative electrode-solid electrolyte laminate comprising a negative electrode current collector layer, a negative electrode active material layer, and a solid electrolyte layer laminated in this order, and a second positive electrode laminate comprising a positive electrode active material layer and a positive electrode current collector layer laminated in this order. At the portion where the positive electrode current collector layer and the negative electrode current collector layer are laminated adjacent to each other, a "positive electrode/negative electrode current collector layer" which serves as both the positive electrode current collector layer and the negative electrode current collector layer may be used in place of the adjacent positive electrode current collector layer and negative electrode current collector layer.

Note that monopolar-type all-solid-state battery laminates and bipolar-type all-solid-state battery laminates are not limited to the examples described above, but can be appropriately selected in accordance with intended use or application of the desired all-solid-state battery.

(Positive Electrode Current Collector Layer)

The positive electrode current collector layer includes a positive electrode current collector protruding part which protrudes in the surface direction. Furthermore, the positive electrode current collector protruding part may be electrically connected to a positive electrode current collector tab.

The material constituting the positive electrode current collector layer is not particular limited and examples thereof include various metals such as silver, copper, gold, aluminum, nickel, iron, stainless steel (SUS), titanium, or alloys thereof. From the viewpoint of chemical stability, an aluminum current collector layer is preferably used as the positive electrode current collector layer.

The form of the positive electrode current collector layer is not particularly limited and can be, for example, a plate, a foil, or a mesh.

(Positive Electrode Active Material Layer)

The positive electrode active material layer includes at least a positive electrode active material and preferably further includes a solid electrolyte, which is described later. In addition thereto, additives which are used in the positive electrode active material layers of all-solid-state batteries, such as a conductive aid or a binder, can be included in accordance with the intended use or application.

The material of the positive electrode active material is not particularly limited. For example, the positive electrode active material may be lithium cobalt oxide ($LiCoO_2$), lithium nickel oxide ($LiNiO_2$), lithium manganate ($LiMn_2O_4$), $LiCo_{1/3}Ni_{1/3}Mn_{1/3}O_2$ or a heterogeneous-element-substituted Li—Mn spinel represented by $Li_{1+x}Mn_{2-x-y}M_yO_4$ (wherein M is at least one metal element selected from Al, Mg, Co, Fe, Ni and Zn). However, the material of the positive electrode active material layer is not limited thereto.

The conductive aid is not particularly limited. For example, the conductive aid may be a carbon material, such as VGCF (vapor grown carbon fiber) or carbon nanofibers, or a metal material. However, the conductive aid is not limited thereto.

The binder is not particularly limited. For example, the binder may be a material such as polyvinylidene fluoride (PVdF), carboxymethyl cellulose (CMC), butadiene rubber (BR), styrene butadiene rubber (SBR), or combinations thereof. However, the binder is not limited thereto.

(Solid Electrolyte Layer)

The solid electrolyte layer includes at least a solid electrolyte. The solid electrolyte is not particularly limited and any material commonly used as the solid electrolyte in all-solid-state batteries can be used. For example, the solid electrolyte may be a sulfide solid electrolyte, oxide solid electrolyte, or polymeric electrolyte. However, the solid electrolyte is not limited thereto.

Examples of the sulfide solid electrolyte include sulfide-based amorphous solid electrolytes, sulfide-based crystalline solid electrolytes, or aldylodyte-type solid electrolytes. However, the sulfide solid electrolyte is not limited thereto. Examples of specific sulfide solid electrolytes include $Li_2S$—$P_2S_5$-type compounds (such as $Li_7P_3S_{11}$, $Li_3PS_4$, or $Li_8P_2S_9$), $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$GeS_2$ (such as $Li_{13}GeP_3S_{16}$ or $Li_{10}GeP_2S_{12}$), $LiI$—$Li_2S$—$P_2O_5$, $LiI$—$Li_3PO_4$—$P_2S_5$, $Li_{7-x}PS_{6-x}Cl_x$, or combinations thereof. However, the sulfide solid electrolyte is not limited thereto.

Examples of the oxide solid electrolyte include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$, or $Li_{3+x}PO_{4-x}N_x$ (LiPON). However, the oxide solid electrolyte is not limited to these materials.

Examples of the polymeric electrolyte include polyethylene oxide (PEO), polypropylene oxide (PPO), and copolymers thereof. However, the polymeric electrolyte is not limited thereto.

The solid electrolyte may be a glass or a crystallized glass (glass ceramic). Furthermore, in addition to the above-described solid electrolytes, the solid electrolyte layer may include a binder as necessary. Specific examples thereof are the same as the "binders" described above for the "positive electrode active material layer".

(Negative Electrode Active Material Layer)

The negative electrode active material layer includes at least a negative electrode active material and preferably further includes a solid electrolyte as described above. In addition thereto, depending on the purpose or application thereof, for example, additives commonly used in the negative electrode active material layer of all-solid-state batteries, such as a conductive aid or binder, can be included.

The material of the negative electrode active material is not particularly limited. The material is preferably capable of occluding and releasing metal ions such as lithium ions. For example, the negative electrode active material may be an alloy-based negative electrode active material or a carbon material. However, the material of the negative electrode active material layer is not limited thereto.

The alloy-based negative electrode active material is not particularly limited, and, for example, a Si alloy-based negative electrode active material or a Sn alloy-based negative electrode active material can be used. The Si alloy-based negative electrode active material can be silicon, silicon oxide, silicon carbide, silicon nitride, or a solid solution thereof. Furthermore, the Si alloy-based negative electrode active material can include an element other than silicon, such as Fe, Co, Sb, Bi, Pb, Ni, Cu, Zn, Ge, In, Sn, or Ti. The Sn alloy-based negative electrode active material can be tin, tin oxide, tin nitride, or a solid solution thereof. Furthermore, the Sn alloy-based negative electrode active material can include an element other than tin, such as Fe, Co, Sb, Bi, Pb, Ni, Cu, Zn, Ge, In, Ti, or Si.

The carbon material is not particularly limited and can be, for example, a hard carbon, a soft carbon, or graphite.

Regarding the solid electrolyte and other additives such as the conductive aid and binder used in the negative electrode active material layer, those described above in the sections "positive electrode active material layer" and "solid electrolyte layer" can be appropriately used.

(Negative Electrode Current Collector Layer)

The negative electrode current collector layer includes a negative electrode current collector protruding part which protrudes in the surface direction. Furthermore, the negative electrode current collector protruding part may be electrically connected with a negative electrode current collector tab.

The material constituting the negative electrode current collector layer is not particular limited and examples thereof include various metals such as silver, copper, gold, aluminum, nickel, iron, stainless steel (SUS), titanium, or alloys thereof. From the viewpoint of chemical stability, a copper current collector layer is preferably used as the negative electrode current collector layer.

The form of the negative electrode current collector layer is not particularly limited and can be, for example, a plate, a foil, or a mesh.

<<All-Solid-State Battery Production Method>>

The present disclosure further provides a first method, a second method, and a third method as the methods for producing the all-solid-state battery described above. Using any of these methods, the all-solid-state battery of the present disclosure can be produced, in particular, an all-solid-state battery of the present disclosure, in which the edges are at least partially covered by the resin layer so that the positive electrode current collector protruding part does not directly contact the edge of the negative electrode-solid electrolyte laminate in the surface direction can be produced.

Each of the production methods will be described in detail below. Note that in each of the production methods, duplicate explanations of the portions that can be shared (e.g., the material, equipment, process, etc.) have been omitted.

<First Method for Producing All-Solid-State Battery>

The first method for producing the all-solid-state battery includes the following steps:

(a) applying a resin constituting the resin layer to a releasable substrate, (b) contacting, from a lower side, the resin with an edge of a lower side of the second electrode-solid electrolyte laminate in the surface direction to at least partially coat the edge of the lower side in the surface direction with the resin, and (c) releasing the releasable substrate from the resin.

(Step (a))

In step (a), the resin constituting the resin layer described above is applied to a releasable substrate.

"Releasable substrate" refers to a material from which the resin constituting the resin layer can be easily released, and has a function to support the resin.

The material of the releasable substrate is not particularly limited and can be appropriately selected in accordance with the type of resin used. For example, the material of the releasable substrate may be a resin film or a metal sheet.

Examples of the resin film include polyethylene (PE), polyethylene terephthalate (PET), polybutylene terephthalate (PBT), polypropylene (PP), polyvinyl chloride (PVC), polystyrene (PS), syndiotactic polystyrene (SPS), polymethylmethacrylate (PMMA), acrylonitrile-butadiene-styrene copolymer (ABS), cycloolefin polymers (COP), polyamides (PA), polyimides (PI), polycarbonates (PC), and fluororesins such as Teflon® sheets. However, the resin film is not limited thereto.

Examples of the metal sheet include aluminum, nickel, copper, stainless steel (SUS), and titanium. However, the metal sheet is not limited thereto.

The resin constituting the resin layer is not particularly limited and may be a curable resin or a thermoplastic resin. Furthermore, the curable resin may be a thermosetting resin, a photocurable resin (for example, a UV-curing resin), or an electron-beam-curable resin. Specific examples of these resins are the same as the resins described above in the section "resin layer".

The form of the resin prior to constituting the resin layer is not particularly limited and, in general, from the viewpoint of ease of handling, the resin is preferably a liquid. Note that "liquid" does not necessarily mean a liquid state at room temperature, and the resin may be melted by heating.

The method for applying the resin constituting the aforementioned resin layer onto the releasable substrate is not particularly limited. For example, a slit-coating method in which the resin in a liquid state is discharged from an application head may be used.

The amount of resin applied onto the substrate is not particularly limited and can be appropriately selected depending on the desired resin layer thickness.

(Step (b))

In step (b), the resin is contacted, from the lower side, with the edge of the lower side of the negative electrode-solid electrolyte laminate in the surface direction to at least partially coat the edge of the lower side in the surface direction with resin.

"Resin" refers to the resin applied to the releasable substrate in step (a). Furthermore, the contact position between the resin and the edge of the lower side of the negative electrode-solid electrolyte laminate in the surface direction may be a position at which the positive electrode current collector protruding part may contact the edge of the negative electrode-solid electrolyte laminate in the surface direction. Furthermore, contacting the resin from the lower side with the edge of the lower side of the negative electrode-solid electrolyte laminate in the surface direction means supplying the resin to the edge of the lower side of the negative electrode-solid electrolyte laminate in the surface direction counter to gravity.

The negative electrode-solid electrolyte laminate is not particularly limited and can be formed depending on the desired type of all-solid-state battery laminate. The method for forming the negative electrode-solid electrolyte laminate is not particularly limited. For example, the negative electrode-solid electrolyte laminate can be formed by applying a negative electrode active material layer slurry comprising a negative electrode active material, as well as additives and solvents as necessary, to both surfaces of a negative electrode current collector layer, and thereafter, further applying a solid electrolyte layer slurry comprising a solid electrolyte, as well as additives and solvents as necessary, to both surfaces thereof, and finally drying and pressing as necessary.

Furthermore, the negative electrode-solid electrolyte laminate may be used alone or may further include a positive electrode laminate laminated on one surface or both surfaces thereof in the lamination direction. The method for forming the positive electrode laminate is not particular limited. For example, the positive electrode laminate can be formed by applying a positive electrode active material layer slurry comprising a positive electrode active material, as well as additives and solvents as necessary to one surface of a positive electrode current collector layer, and subsequently drying and pressing as necessary.

Thus, the edge of the negative electrode-solid electrolyte laminate can be at least partially coated with resin by performing step (b). Furthermore, when contacting the resin from the lower side with the edge of the lower side of the negative electrode-solid electrolyte laminate in the surface direction, the resin can flow from the contacted edge of the lower side of the negative electrode-solid electrolyte laminate in the surface direction in each direction due to the force exerted from the lower side due to the supporting by the releasable substrate. As a result, the resin can coat from the contacted edge of the lower side of the negative electrode-solid electrolyte laminate in the surface direction to the entirety of the edge of the lower side in the surface direction and/or a portion of the end face of the negative electrode-solid electrolyte laminate. Furthermore, when the resin flows to a portion of the end face of the negative electrode-solid electrolyte laminate, the resin can reach the negative electrode current collector protruding part, which protrudes from the end face of the negative electrode current collector layer of the negative electrode-solid electrolyte laminate in the surface direction. In other words, in this case, the resin can coat a portion of the negative electrode current collector protruding part.

Furthermore, in order to coat the entirety of the edge of the negative electrode-solid electrolyte laminate in the surface direction (i.e., the entirety of the edge of the lower side and the edge of the upper side in the surface direction of the negative electrode-solid electrolyte laminate in the surface direction), the entirety of the end face of the negative electrode-solid electrolyte laminate, a portion of the surface of the upper side, and a portion of the surface of the lower side of the negative electrode current collector protruding part with resin, the following step (b1) is preferably performed after step (b) and before step (c).

(Step (b1))

In step (b1), the resin constituting the resin layer is applied, from an upper side, to an edge of an upper side of the negative electrode-solid electrolyte laminate in the surface direction opposite the resin-coated edge of the lower side in the surface direction to coat the edge of the upper side with the resin.

More specifically, the resin constituting the resin layer can be extruded, from the upper side, by, for example, a slit-coating method in which a liquid resin is extruded from an application head, onto the edge of the upper side of the negative electrode-solid electrolyte laminate in the surface direction opposite the resin-coated edge of the lower side in the surface direction. In this case, since the releasable substrate used in step (a) has not yet been released from the resin, the releasable substrate functions as a tray for catching resin falling from the lower side due to the influence of gravity, whereby the resin can be more effectively coated over the entirety of the edge of the negative electrode-solid electrolyte laminate in the surface direction, the entirety of the end face of the negative electrode-solid electrolyte laminate, and a portion of the surface of the upper side of the negative electrode current collector protruding part.

(Step (c))

In step (c), the releasable substrate is released from the resin.

Step (c) can be performed after step (b) described above or after step (b1) has been performed as necessary.

Furthermore, in step (c), a curing or solidifying treatment may be performed on the resin coating negative electrode-solid electrolyte laminate in accordance with the type and properties of the resin used. Note that, the curing or solidifying treatment described below may be performed prior to releasing of the releasable substrate or may be performed after releasing of the releasable substrate. From the viewpoint of efficient releasing of the releasable substrate, it is preferable that the curing or solidifying treatment be further included prior to the releasing of the releasable substrate.

Specifically, when a thermoplastic resin is used as the resin constituting the resin layer, after step (a), step (b), and step (b1), if necessary, have been performed using a thermosetting resin which is liquid at room temperature, the thermosetting resin can be heated and cured. The heating is not particularly limited and may be performed using a heater, hot air, or induction heating. Among these, heating by a non-contact method is preferable.

When an electron-beam-curable resin is used as the resin constituting the resin layer, after step (a), step (b), and step (b1), if necessary, have been performed, it is possible to additionally perform an operation of curing the electron-beam curable resin by electron-beam irradiation. The electron beam source is not particularly limited and can be generated using various electron beam accelerators such as, for example, a Cockcroft-Walton accelerator, a Van de Graaff accelerator, a resonant transformer-type accelerator, an insulating-core transformer-type accelerator, a linear accelerator, a dynamitron, or a high-frequency accelerator.

When a photocurable resin (e.g., a UV-curable resin) is used as the resin constituting the resin layer, after step (a), step (b), and step (b1), if necessary, have been performed, the photocurable resin can be cured by irradiation. The light for curing is not particularly limited and may be ultraviolet rays, visible light, etc. The light source is not particularly limited and can be, for example, a low-pressure mercury lamp, a medium-pressure mercury lamp, a high-pressure mercury lamp, an ultrahigh-pressure mercury lamp, a black light lamp, a microwave-excitation mercury lamp, a metal halide lamp, a sodium lamp, a halogen lamp, a xenon lamp, an LED, or a fluorescent lamp. Furthermore, the angle of irradiation is not particularly limited and can be performed from the upper side, lateral side, perpendicular side, or lower side of the coated resin. Further, in order to increase efficiency of the irradiation, mirror reflection can be used.

When a thermoplastic resin is used as the resin constituting the resin layer, prior to step (a), it is preferable to heat and liquify the thermoplastic resin in advance. After step (b) and step (b1), as necessary, have been performed, the thermoplastic resin can be cured by cooling. The cooling is not particularly limited and can be performed by natural cooling or forced cooling (e.g., air cooling).

From the viewpoint of cycle time and ease of handling, it is preferable that a photocurable resin, in particular, a UV-curable resin, be used as the resin constituting the resin layer. Specifically, after step (b) or step (b1), as necessary, has been performed, it is preferable that the resin layer be formed by irradiating the resin coating the negative electrode-solid electrolyte laminate to cure the resin.

Figure 3:
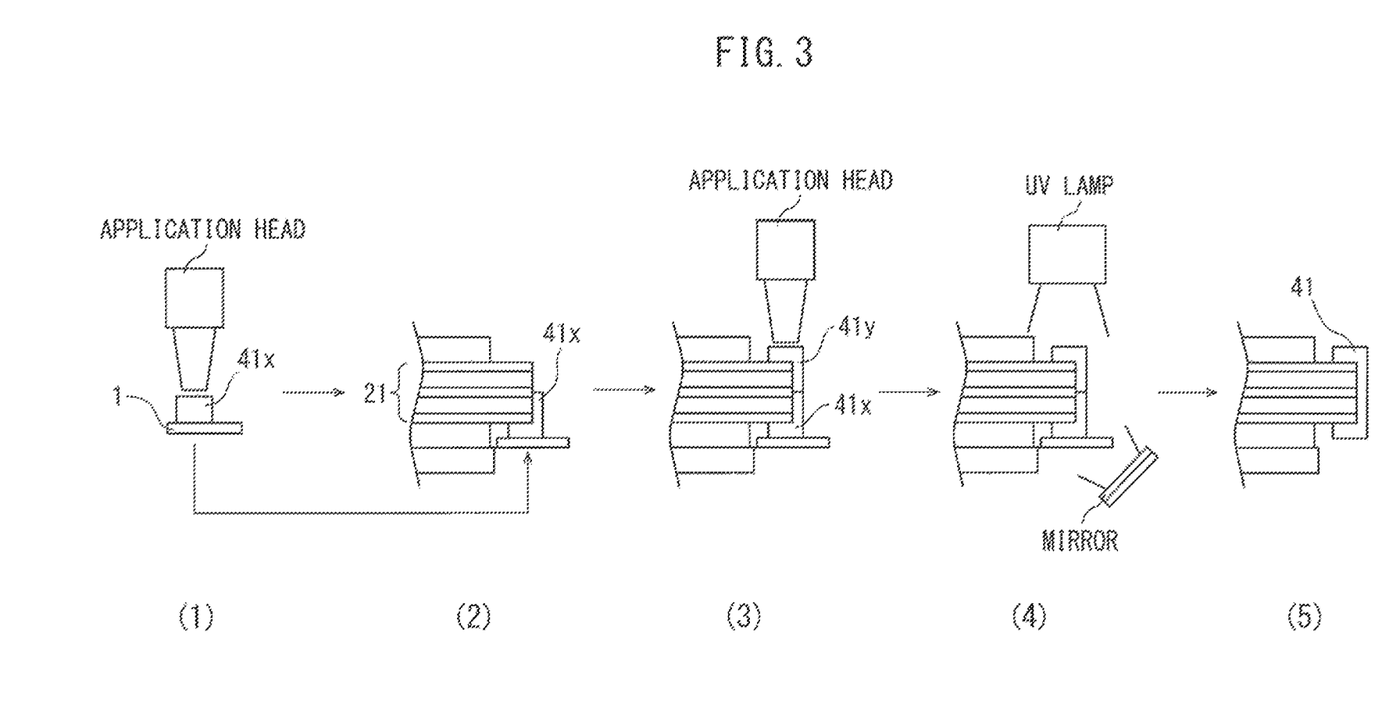
FIG. 3 is a schematic view showing an embodiment of steps of a first method of the present disclosure when producing the all-solid-state battery of the present disclosure.

FIG. 3 is a schematic view showing an embodiment of the steps of the first method of the present disclosure when producing the all-solid-state battery of the present disclosure.

More specifically, FIG. 3(1) is an embodiment of step (a). In this aspect, a resin 41x is applied onto a releasable substrate 1 from an application head. At this time, for example, a UV-curable resin can be used as the resin 41x.

FIG. 3(2) is an embodiment of step (b). In this aspect, the resin 41x is contacted, from the lower side, with the edge of the lower side of the negative electrode-solid electrolyte laminate 21 in the surface direction to coat the edge of the lower side of the negative electrode-solid electrolyte laminate 21 in the surface direction with the resin. At this time, the resin 41x is coated from the edge of the lower side of the negative electrode-solid electrolyte laminate 21 in the surface direction to the center part of the lower side of the end face of the negative electrode-solid electrolyte laminate 21 by the force exerted from the lower side of the releasable substrate 1.

FIG. 3(3) is an embodiment of step (b1). In this aspect, a new resin 41y extruded from the application head is applied, from the upper side, to the edge of the upper side of the negative electrode-solid electrolyte laminate in the surface direction opposite the edge of the lower side of the of the negative electrode-solid electrolyte laminate 21 in the surface direction, which was coated with resin 41x, to coat the upper side of the negative electrode-solid electrolyte laminate 21 with the resin 41y. At this time, the resin 41y flows from the upper side of the negative electrode-solid electrolyte laminate 21 by the force of gravity, reaches the center part of the lower side of the end face of the negative electrode-solid electrolyte laminate 21, and joins with the resin 41x coated in step (b).

FIG. 3(4) is an aspect in which the resins 41x and 41y are irradiated with a UV lamp to cure the resins 41x and 41y. At this time, the light from the UV lamp is reflected using a mirror at the lateral side and the lower side of the resins 41x and 41y to efficiently cure the resins 41x and 41y, whereby the resin layer 41 is formed.

FIG. 3(5) is an embodiment of step (c). In this aspect, the releasable substrate 1 is released from the resin layer 41.

By performing each of the above steps, an all-solid-state battery having the characteristic that the side surface of the negative electrode-solid electrolyte laminate 21 is covered with a "U-shaped" resin layer 41 can be produced.

Note that in FIG. 3, though the positive electrode current collector protruding parts and the negative electrode current collector protruding parts have been omitted, a portion of the negative electrode current collector protruding part can be covered with the resin layer 41 by the above steps.

<Second Method for Producing All-Solid-State Battery>

The second method for producing the all-solid-state battery comprises the following steps:

(d) placing a releasable substrate on a lower side of an edge of the negative electrode-solid electrolyte laminate in the surface direction, (e) applying, from an upper side, a resin constituting the resin layer to the edge of the negative electrode-solid electrolyte laminate in the surface direction to coat the edge of the upper side of the negative electrode-solid electrolyte laminate in the surface direction with the resin, (f) releasing the releasable substrate from the resin, and inverting the second electrode-solid electrolyte layer laminate up-and-down, and (g) applying, from the upper side, the resin constituting the resin layer to the edge of an upper side the negative electrode-solid electrolyte laminate in the surface direction after inversion to coat the edge of the upper side of the second electrode-solid electrolyte laminate in the surface direction after inversion with the resin.

Note that in step (f), the negative electrode-solid electrolyte laminate may be inverted up-and-down after releasing the releasable substrate from the resin or the releasable substrate may be released from the resin after inverting the negative electrode-solid electrolyte laminate up-and-down.

Furthermore, in the second method of the present disclosure, the resin constituting the resin layer can be a photo-curable resin, and the second method of the present disclosure can further comprise forming the resin layer by irradiating the resin coating the edge of the negative electrode-solid electrolyte laminate to cure the resin.

Figure 4:
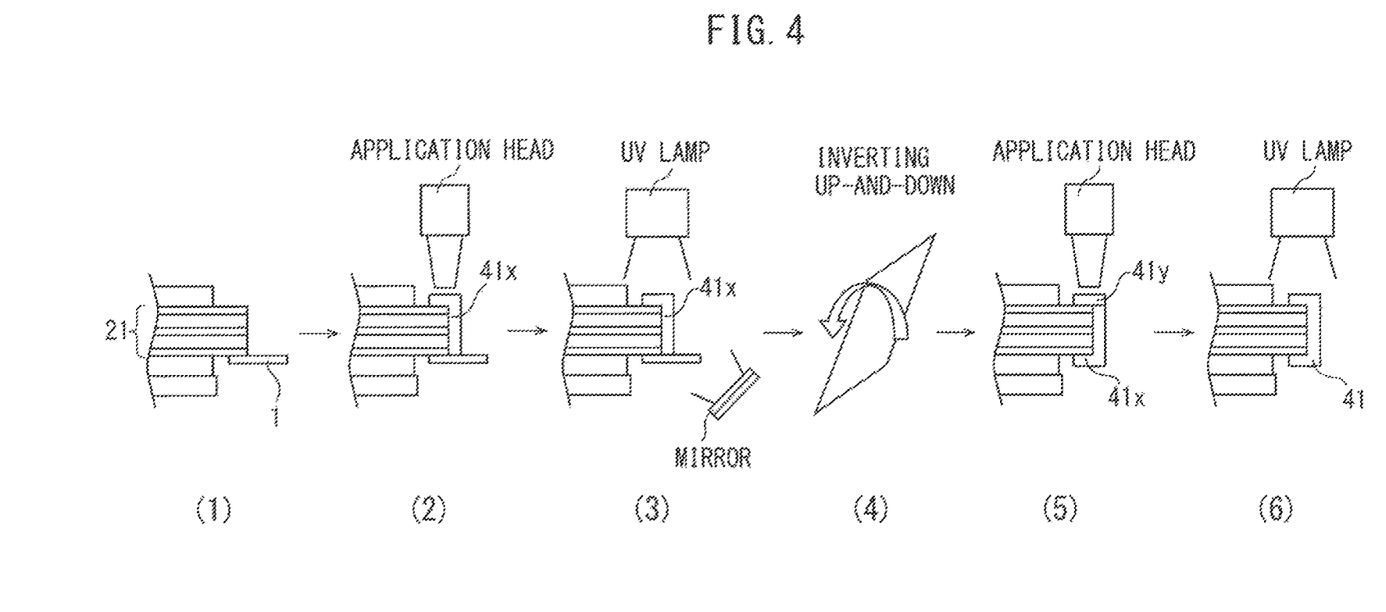
FIG. 4 is a schematic view showing an embodiment of steps of a second method of the present disclosure when producing the all-solid-state battery of the present disclosure.

FIG. 4 is a schematic view showing an embodiment of the steps of the second method of the present disclosure when producing the all-solid-state battery of the present disclosure.

More specifically, FIG. 4(1) is an embodiment of step (d). In this aspect, a releasable substrate is mounted on the lower side of the edge of the negative electrode-solid electrolyte laminate in the surface direction.

FIG. 4(2) is an embodiment of step (e). In this aspect, the resin 41x constituting the resin layer 41 and which is extruded from the application head is applied, from the upper side, to the edge of the negative electrode-solid electrolyte laminate 21 in the surface direction to coat the edge of the upper side of the negative electrode-solid electrolyte laminate 21 in the surface direction with the resin 41x. At this time, a UV-curable resin can be used as the resin 41x. Furthermore, when the resin 41x is a liquid, the resin 41x can flow to the end face of the negative electrode-solid electrolyte laminate 21 using the flowability thereof.

In FIG. 4(3), the resin 41x is UV-irradiated using a UV lamp to cure the resin 41x. At this time, the light from the UV lamp is reflected using a mirror at the lateral side and the lower side of the resin 41x to efficiently cure the resin 41x, whereby the resin layer 41 is formed.

FIG. 4(4) is an embodiment of step (f). In this aspect, the releasable substrate is released from the resin and the negative electrode-solid electrolyte laminate is inverted up-and-down.

FIG. 4(5) is an embodiment of step (g). In this aspect, a new resin 41y extruded from the application head is applied, from an upper side, to an edge of an upper side the negative electrode-solid electrolyte laminate 21 in the surface direction after inversion to coat the edge of the upper side of the negative electrode-solid electrolyte laminate 21 in the surface direction after inversion with the resin 41y. When applying the resin 41y to the edge of the upper side of the negative electrode-solid electrolyte laminate 21 in the surface direction after inversion, in order to form the resin layer as formed by the above step (e) and UV irradiation, it is preferable to apply the resin 41y so as to face this resin layer.

In FIG. 4(6), the resin 41y applied in step (g) is irradiated using a UV lamp to cure the resin 41y, whereby the resin layer 41 is formed. As a result, an all-solid-state battery having the characteristic that the side surface of the negative electrode-solid electrolyte laminate 21 is covered with a "U-shaped" resin layer 41 can be produced.

Note that in FIG. 4, though the positive electrode current collector protruding parts and the negative electrode current collector protruding parts have been omitted, a portion of the negative electrode current collector protruding part can be covered with the resin layer 41 by the above steps.

<Third Method for Producing All-Solid-State Battery>

The third production method of the present disclosure comprises applying, from the upper side and lower side at the same time, the resin constituting the resin layer to the edges of the negative electrode-solid electrolyte laminate in the surface direction to coat the edges of the upper side and the lower side of the negative electrode-solid electrolyte laminate with the resin.

Furthermore, in the third method of the present disclosure, the resin constituting the resin layer is a photocurable resin, and the third method of the present disclosure can further comprise forming the resin layer by irradiating the resin coating the edges of the negative electrode-solid electrolyte laminate to cure the resin.

REFERENCE SIGNS LIST 1 releasable substrate
1a, 1b, 1c positive electrode current collector layer
2a, 2b, 2c positive electrode active material layer
3a, 3b, 3c, 3d solid electrolyte layer
4a, 4b, 4c, 4d negative electrode active material layer
5a, 5c negative electrode current collector layer
20a, 20b edge in surface direction of negative electrode-solid electrolyte laminate 20
20c, 20d edge in lamination direction of negative electrode-solid electrolyte laminate 20
10p, 11p positive electrode current collector protruding part
20p, 21p negative electrode current collector protruding part
10, 11, 12, 13 positive electrode laminate
20, 21 negative electrode-solid electrolyte laminate
30, 31 all-solid-state battery laminate
40a, 40b, 41 resin layer
41x, 41y resin
100, 200 all-solid-state battery

What is claimed is:

1. A method for producing an all-solid-state battery, comprising:
an all-solid-state battery laminate in which at least one first electrode laminate and at least one second electrode-solid electrolyte laminate are laminated, wherein the first electrode laminate comprises a first electrode current collector layer and a first electrode active material layer formed on at least one surface of the first electrode current collector layer, wherein the second electrode-solid electrolyte laminate comprises a second electrode current collector layer and a second electrode active material layer formed on at least one surface of the second electrode current collector layer, wherein on a first side surface of the all-solid-state battery laminate, the first electrode current collector layer comprises a first electrode current collector protruding part, which protrudes in a surface direction, and the second electrode current collector layer comprises a second electrode current collector protruding part, which protrudes in a surface direction, wherein a surface direction area of the second electrode-solid electrolyte laminate is larger than a surface direction area of the first electrode laminate, and the first electrode laminate is laminated on the inside of the second electrode-solid electrolyte laminate when viewed from the lamination direction, and wherein on the first side surface, only an edge of the second electrode-solid electrolyte laminate in the surface direction is at least partially covered with a resin layer, comprising the following steps:
(a) applying a resin constituting the resin layer to a releasable substrate,
(b) contacting, from a lower side, the resin with an edge of a lower side of the second electrode-solid electrolyte laminate in the surface direction to at least partially coat the edge of the lower side in the surface direction with the resin, and
(c) releasing the releasable substrate from the resin.

2. The method according to claim 1, further comprising:
(b1) after step (b) and before step (c), applying, from an upper side, the resin constituting the resin layer to an edge of an upper side of the second solid electrolyte laminate in the surface direction opposite the resin-coated edge of the lower side in the surface direction to coat the edge of the upper side with the resin.

3. A method for producing an all-solid-state battery, comprising: an all-solid-state battery laminate in which at least one first electrode laminate and at least one second electrode-solid electrolyte laminate are laminated, wherein the first electrode laminate comprises a first electrode current collector layer and a first electrode active material layer formed on at least one surface of the first electrode current collector layer, wherein the second electrode-solid electrolyte laminate comprises a second electrode current collector layer and a second electrode active material layer formed on at least one surface of the second electrode current collector layer, wherein on a first side surface of the all-solid-state battery laminate, the first electrode current collector layer comprises a first electrode current collector protruding part, which protrudes in a surface direction, and the second electrode current collector layer comprises a second electrode current collector protruding part, which protrudes in a surface direction, wherein a surface direction area of the second electrode-solid electrolyte laminate is larger than a surface direction area of the first electrode laminate, and the first electrode laminate is laminated on the inside of the second electrode-solid electrolyte laminate when viewed from the lamination direction, and wherein on the first side surface, only an edge of the second electrode-solid electrolyte laminate in the surface direction is at least partially covered with a resin layer, comprising the following steps:
(d) placing a releasable substrate on a lower side of an edge of the second electrode-solid electrolyte laminate in the surface direction,
(e) applying, from an upper side, a resin constituting the resin layer to an edge of the second electrode-solid electrolyte laminate in the surface direction to coat an edge of an upper side of the second electrode-solid electrolyte laminate in the surface direction with the resin,
(f) releasing the releasable substrate from the resin, and inverting the second electrode-solid electrolyte layer laminate up-and-down, and
(g) applying, from an upper side, a resin constituting the resin layer to an edge of an upper side the second electrode-solid electrolyte laminate in the surface direction after inversion to coat an edge of an upper side of the second electrode-solid electrolyte laminate in the surface direction after inversion with the resin.

4. A method for producing an all-solid-state battery, comprising: an all-solid-state battery laminate in which at least one first electrode laminate and at least one second electrode-solid electrolyte laminate are laminated, wherein the first electrode laminate comprises a first electrode current collector layer and a first electrode active material layer formed on at least one surface of the first electrode current collector layer, wherein the second electrode-solid electrolyte laminate comprises a second electrode current collector layer and a second electrode active material layer formed on at least one surface of the second electrode current collector layer, wherein on a first side surface of the all-solid-state battery laminate, the first electrode current collector layer comprises a first electrode current collector protruding part, which protrudes in a surface direction, and the second electrode current collector layer comprises a second electrode current collector protruding part, which protrudes in a surface direction, wherein a surface direction area of the second electrode-solid electrolyte laminate is larger than a surface direction area of the first electrode laminate, and the first electrode laminate is laminated on the inside of the second electrode-solid electrolyte laminate when viewed from the lamination direction, and wherein on the first side surface, only an edge of the second electrode-solid electrolyte laminate in the surface direction is at least partially covered with a resin layer, comprising the following step:

applying, from an upper side and a lower side at the same time, a resin constituting the resin layer to edges of the second electrode-solid electrolyte laminate in the surface direction to coat the edges of the upper side and the lower side with the resin.

5. The method according to claim 1, wherein
the resin constituting the resin layer is a photocurable resin, and
the method further comprises forming the resin layer by irradiating the resin coating the second electrode-solid electrolyte laminate to cure the resin.

6. The method according to claim 2, wherein
the resin constituting the resin layer is a photocurable resin, and
the method further comprises forming the resin layer by irradiating the resin coating the second electrode-solid electrolyte laminate to cure the resin.

7. The method according to claim 3, wherein
the resin constituting the resin layer is a photocurable resin, and
the method further comprises forming the resin layer by irradiating the resin coating the second electrode-solid electrolyte laminate to cure the resin.

8. The method according to claim 4, wherein
the resin constituting the resin layer is a photocurable resin, and
the method further comprises forming the resin layer by irradiating the resin coating the second electrode-solid electrolyte laminate to cure the resin.

* * * * *